No. 877,113. PATENTED JAN. 21, 1908.
J. N. OWENS.
SHAFT COUPLING.
APPLICATION FILED MAR. 9, 1907.
2 SHEETS—SHEET 1.
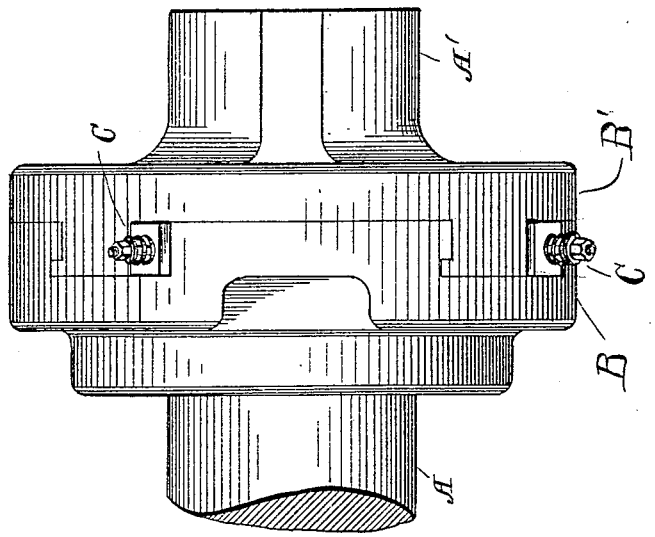
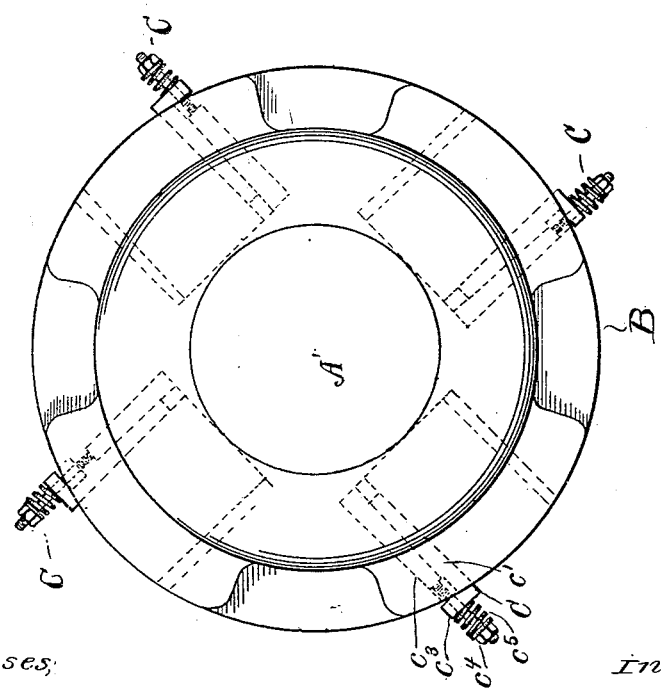
Witnesses:
H. M. Booth
Jno. F. Oberlin
Inventor,
Joseph N. Owens,
by J. B. Fay
his Attorney No. 877,113. PATENTED JAN. 21, 1908.
J. N. OWENS.
SHAFT COUPLING.
APPLICATION FILED MAR. 9, 1907.

2 SHEETS—SHEET 2.

Witnesses;
H. M. Booth
Jno. F. Oberlin

Inventor,
Joseph N. Owens,
by J. B. Fay
his Attorney

UNITED STATES PATENT OFFICE.

JOSEPH N. OWENS, OF YOUNGSTOWN, OHIO, ASSIGNOR OF ONE-HALF TO JOHN E. FOWLER, OF YOUNGSTOWN, OHIO.

SHAFT-COUPLING.

No. 877,113.  Specification of Letters Patent.  Patented Jan. 21, 1908.

Application filed March 9, 1907. Serial No. 361,600.

*To all whom it may concern:*

Be it known that I, JOSEPH N. OWENS, a citizen of the United States, resident of Youngstown, county of Mahoning, and State of Ohio, have invented a new and useful Improvement in Shaft-Couplings, of which the following is a specification, the principle of the invention being herein explained and the best mode in which I have contemplated applying that principle, so as to distinguish it from other inventions.

This my present invention relates, as indicated, to improvements in devices for coupling together the ends of shafts, and particularly for coupling an engine to the shaft which it is to drive. In this particular application it becomes a crab coupling or clutch in effect.

The object of such invention is to provide a coupling that, in addition to being simple and economical in construction, will present superior features in the matter of securing a rigid connection between the two shafts and one that will not be unduly subject to wear.

To the accomplishment of these and related ends said invention consists of means hereinafter fully described and particularly pointed out in the claims.

The annexed drawings and the following description set forth in detail means embodying the invention, such disclosed means, however, constituting but one of various mechanical forms in which the principle of the invention may be used.

Figure 4:
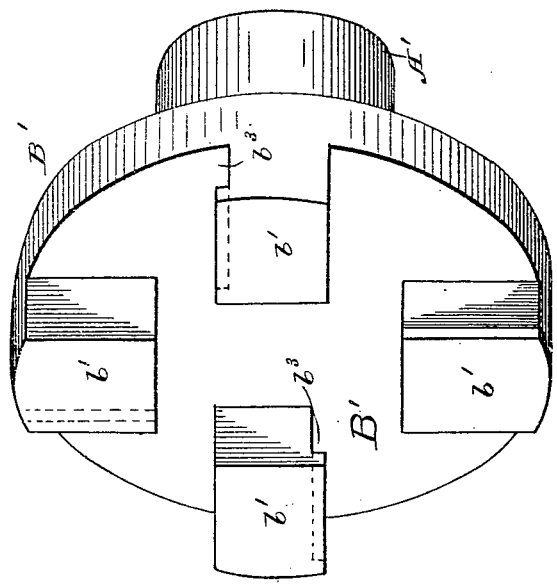
Figure 3:
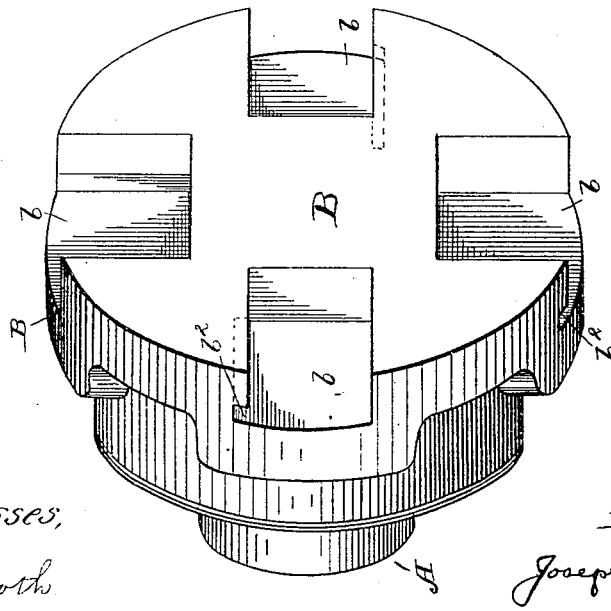

In said annexed drawings: Figure 1 represents in end elevation two shaft connections disposed end to end and joined together by means of one form of my improved coupling; Fig. 2 is a side elevation of the shafts and coupling shown in Fig. 1; Fig. 3 is a perspective view of one shaft-end with the parts of the coupling appertaining thereto; while Fig. 4 is a corresponding perspective view of the other shaft-end likewise provided with the parts of the coupling belonging to it.

In said figures A A' represent the adjacent terminal portions of two alined shafts whose ends it is desired to couple together. It is obviously immaterial what the shafts are so far as our present purpose is concerned; they are hence shown apart from all connections, such as it is understood will ordinarily accompany them. In the approved forms of my device illustrated the base or main parts of the coupling are shown as integral with such ends or as in effect forming the ends referred to and the coupling structure is then inclusive of such ends. These ends are of enlarged diameter compared with the diameter of the shaft proper and comprise two complementary disks or plates B B'. In the face of plate B, forming the enlarged end of shaft A, are formed a plurality of peripheral recesses or slots $b$ of general rectangular form and radially disposed with reference to the shaft axis. The number of these slots may be varied to suit different requirements, there being four in the device shown. Similarly directed sides of each slot $b$ are furthermore under-cut so as to be provided with grooves $b^2$.

Corresponding with the recesses or slots $b$ of plate B, which constitutes the female member of the coupling, plate B', constituting the male member of such coupling, is provided with a plurality of lugs $b'$, projecting in a direction parallel with the axis of the shaft A' and under-cut on similarly directed sides so as to be provided with grooves $b^3$. The sides of lugs $b'$ in which such grooves $b^3$ are thus provided are those sides that will be opposed to the under-cut slots $b$ of member B of the coupling. The relative widths of slots $b$ and lugs $b'$ are such as to permit of the introduction of said lugs into said slots upon the faces of the two members B B' being brought into juxtaposition and the aforesaid grooves, and the tongues which are formed by them, in the sides of the slot and lugs respectively, are designed to be complementary so as to register together and thus lock the two shaft-ends firmly against disengagement. In order thus to lock the complementary tongues and grooves of slot $b$ and lugs $b'$ together, I provide a locking member C, Fig. 1. Such locking member C comprises two coacting wedges $c\ c'$ that when in their extended position permit of the introduction of such member between the two opposing smooth walls of the registering slot and lug. Upon the wedges being drawn together, obviously the member C will be expanded tightly against such walls and the complementary grooves and tongues will be securely held against disengagement. To thus draw co-acting wedges $c\ c'$ together, with the result just noted, the outer end of one of said members is screw-threaded and disposed to slidably project through an ear $c^3$ laterally projecting from the extremity of the other member. A nut $c^4$, threaded on the end of such member $c$, upon being rotated is clearly adapted to effect the result desired. A resilient member, as a helical spring $c^5$, is desirably introduced intermediate of nut $c^4$ and ear $c^3$.

It will be understood that it is not essential that the disks or plates B B', which form the basis of the coupling structure, should be as here shown and described integral with the shaft-ends. They might be detachably or otherwise secured thereto. So, too, the relative size and number of the slots $b$ and lugs $b'$ may be varied from that here shown for the purpose of illustration. The interlocking of the tongues and grooves of the several lugs and slots will in all cases serve to effect a strong and rigid coupling, giving the united shafts practically the same qualities as though they were one continuous structure. At the same time such coupling is very easily disassembled, for locking members C are easily extended sufficiently to permit their ready withdrawal from the slots, whereupon a simple part turn given to one shaft frees it entirely from connection with the other.

Other modes of applying the principle of my invention may be employed instead of the one explained, change being made as regards the mechanism herein disclosed, provided the means stated by the following claim or the equivalent of such stated means be employed.

I therefore particularly point out and distinctly claim as my invention:—

A shaft coupling comprising the combination with two shafts the meeting ends of said shafts being of enlarged diameter and the face of one being formed with a plurality of peripherally disposed, radial slots, the other with corresponding lugs adapted to register in said slots, said slots and lugs being provided with complementary tongues and grooves; of a pair of co-acting wedges adapted in their extended position to enter between the opposing smooth sides of each registering slot and lug, the outer ends of said wedges projecting without said slots, one wedge being screw-threaded and slidably engaging the other; a nut on such screw-threaded wedge adapted to draw said wedges together and thereby lock said tongues and grooves against disengagement; and resilient means interposed between said nut and said other wedge.

Signed by me, this 5th day of March, 1907.

JOSEPH N. OWENS.

Attested by—
J. W. DAVIS,
J. M. MANSELL.